UNITED STATES PATENT OFFICE.

AXEL VIDAR JERNBERG, OF TIDAHOLM, SWEDEN.

FERMENTATION OF SULFITE WASTE LIQUOR.

1,221,058.     Specification of Letters Patent.     Patented Apr. 3, 1917.

No Drawing.     Application filed February 6, 1917.   Serial No. 146,978.

*To all whom it may concern:*

Be it known that I, AXEL VIDAR JERNBERG, a subject of the King of Sweden, residing at Tidaholm, Sweden, have invented new and useful Improvements in Fermentation of Sulfite Waste Liquors, of which the following is a specification.

For transforming by fermentation the fermentable saccharine substances contained in waste lyes from the manufacture of sulfite cellulose or in other lyes of like kind, obtained in the treatment of cellulose or materials containing cellulose with solutions of acids or acid salts, it is necessary to remove from the lyes the free acids which may be present in them and prevent the fermentation and moreover to provide the lye with a suitable nutritive of nitrogen for keeping the ferment cells alive and permitting their development during the fermentation.

The present invention relates to a process of fermenting lyes of the nature above described, especially the waste lye from the manufacture of sulfite cellulose, first by means of calcium cyanamid ($CaCN_2$), in the manner hereinafter described making the lye suitable for fermentation and thereafter to produce such a fermentation in it by the addition of a ferment.

The method is based upon the property of the calcium cyanamid of being transformed upon the addition of water (slowly at the ordinary temperature, but rapidly at an elevated temperature and under pressure) into hydrate of calcium, carbonate of calcium, urea and finally ammonia according to the formulas:

1.  $CaCN_2 + 3H_2O = Ca(OH)_2 + CO(NH_2)_2$
    1b. $CO(NH_2)_2 + H_2O = CO_2 + 2NH_3$
    1c. $Ca(OH)_2 + CO_2 = CaCO_3 + H_2O$
2.  $CaCN_2 + 3H_2O = CaCO_3 + 2NH_3$

If now to the waste sulfite lye, obtained in the manufacture of sufite cellulose (which lye after the finished boiling contains a considerable quantity of free sulfurous acid and other substances with an acid reaction), calcium cyanamid is added, the reactions indicated hereinafter can be supposed to take place with a speed depending upon the pressure and temperature conditions.

*a.* The calcium cyanamid is converted by the free sulfurous acid of the lye into sulfite of calcium and free cyanamid according to the formula:

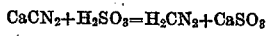

$CaCN_2 + H_2SO_3 = H_2CN_2 + CaSO_3$

*b.* The cyanamid is converted by the water in the lye into urea and ammonia according to the formulas:

$H_2CN_2 + H_2O = CO(NH_2)_2$
$CO(NH_2)_2 + H_2O = CO_2 + 2NH_3$
$H_2CN_2 + 2H_2O = CO_2 + 2NH_3$

*c.* The urea and the ammonia thus obtained form with further quantities of acid in the lye urates and ammonium salts according to the formulas:

$CO(NH_2)_2 + H_2SO_3 = CO(NH_2)_2H_2SO_3$
$2NH_3 + H_2SO_3 = (NH_4)_2SO_3$

From what is explained it will be evident that as well the calcium as the nitrogen in the calcium cyanamid compound thus will act as a neutralizing agent upon the acids in the lye, which at the same time is supplied with a nitrogenous nutrient in the form of urates and salts of ammonium.

The quantity of calcium cyanamid required for every cubic meter of lye depends upon the want of nitrogen and the acidity of the lye and also upon the quantity of nitrogen in the calcium cyanamid. Generally one cubic meter of lye requires not over 0.1 kilogram nitrogen or 0.5 kilogram calcium cyanamid containing 20% nitrogen.

Hereafter I will give some examples of the practical use of the invention:

Example 1: From the boiler in which the sulfite cellulose is preferably manufactured, the lye at a temperature of about 95° C. is carried through a vacuum apparatus for the purpose of removing the free sulfurous acid contained in it and thus of economizing the neutralizing means. To the lye is added a quantity of calcium cyanamid corresponding to the nitrogen required and the acidity of the lye, so that after neutralizing the said acidity is reduced to from 2 to 4%. When the lye is very acid, special neutralizing means as lime stone, chalk, lime, etc., must be added.

The lye thus treated is left during about 75 hours, whereupon the ferment is added, when the lye has a temperature of about 25°–32° C., and the fermentation begins.

Example 2: The whole or part of the quantity of the calcium cyanamid before the addition to the lye is treated with water during a longer period of time at an ordinary temperature or during a shorter time at an elevated temperature and under pressure, whereby the compound breaks up and the formation of urea and ammonia is hastened. The product thus obtained is added to the lye as above described whereupon the treatment is continued as under Example 1.

If it is desired to hasten the reaction still more the calcium cyanamid before the addition to the lye may be treated with basic solutions, for instance of NaOH, $Ca(OH)_2$ etc.

Having now particularly described the nature of my invention and the manner of its operation, what I claim is:

1. An improved method of fermenting lyes obtained in the treatment of cellulose and the like with acid solutions consisting in adapting the lye for fermentation by the addition of a suitable quantity of calcium cyanamid ($CaCN_2$), corresponding to the want of nitrogen and the acidity of the lye, then adding a ferment and subjecting the lye to fermentation at a suitable temperature.

2. An improved method of fermenting lyes obtained in the treatment of cellulose and the like with acid solutions consisting in adapting the lye for fermentation by the addition of neutralizing means and a suitable quantity of calcium cyanamid ($CaCN_2$) corresponding to the need for nitrogen and the acidity of the lye, then adding a ferment and subjecting the lye to fermentation at a suitable temperature.

3. An improved method of fermenting lyes obtained in the treatment of cellulose and the like with acid solutions, consisting in adapting the lye for fermentation by the addition of a suitable quantity of calcium cyanamid ($CaCN_2$), previously treated with water, adding a ferment and subjecting the lye to fermentation at a suitable temperature.

4. An improved method of fermenting lyes obtained in the treatment of cellulose and the like with acid solutions consisting in adapting the lye for fermentation by the addition of a suitable quantity of calcium cyanamid ($CaCN_2$), previously treated with steam, adding a ferment and subjecting the lye to fermentation at a suitable temperature.

5. An improved method of fermenting lyes obtained in the treatment of cellulose and the like with acid solutions, consisting in adapting the lye for fermentation by the addition of neutralizing means and a suitable quantity of calcium cyanamid ($CaCN_2$), previously treated with water, adding a ferment and subjecting the lye to fermentation at a suitable temperature.

6. An improved method of fermentation of lyes obtained in the treatment of cellulose and the like with acid solutions, consisting in adapting the lye to fermentation by the addition of neutralizing means and a suitable quantity of calcium cyanamid ($CaCN_2$), previously treated with steam, adding a ferment and subjecting the lye to fermentation at a suitable temperature.

In testimony whereof I have signed my name to this specification in the presence of two subscribing witnesses.

AXEL VIDAR JERNBERG.

Witnesses:
H. TELANDER,
SHAGNUSSAN.